INVENTORS
Edward V. Kools
Alexander Jacobsen
BY
ATTORNEYS

June 26, 1962 A. JACOBSEN ETAL 3,040,794
FORAGE CUTTER AND BLOWER
Filed June 29, 1960 5 Sheets-Sheet 2

INVENTORS
Edward V. Kools
Alexander Jacobsen
BY
ATTORNEYS

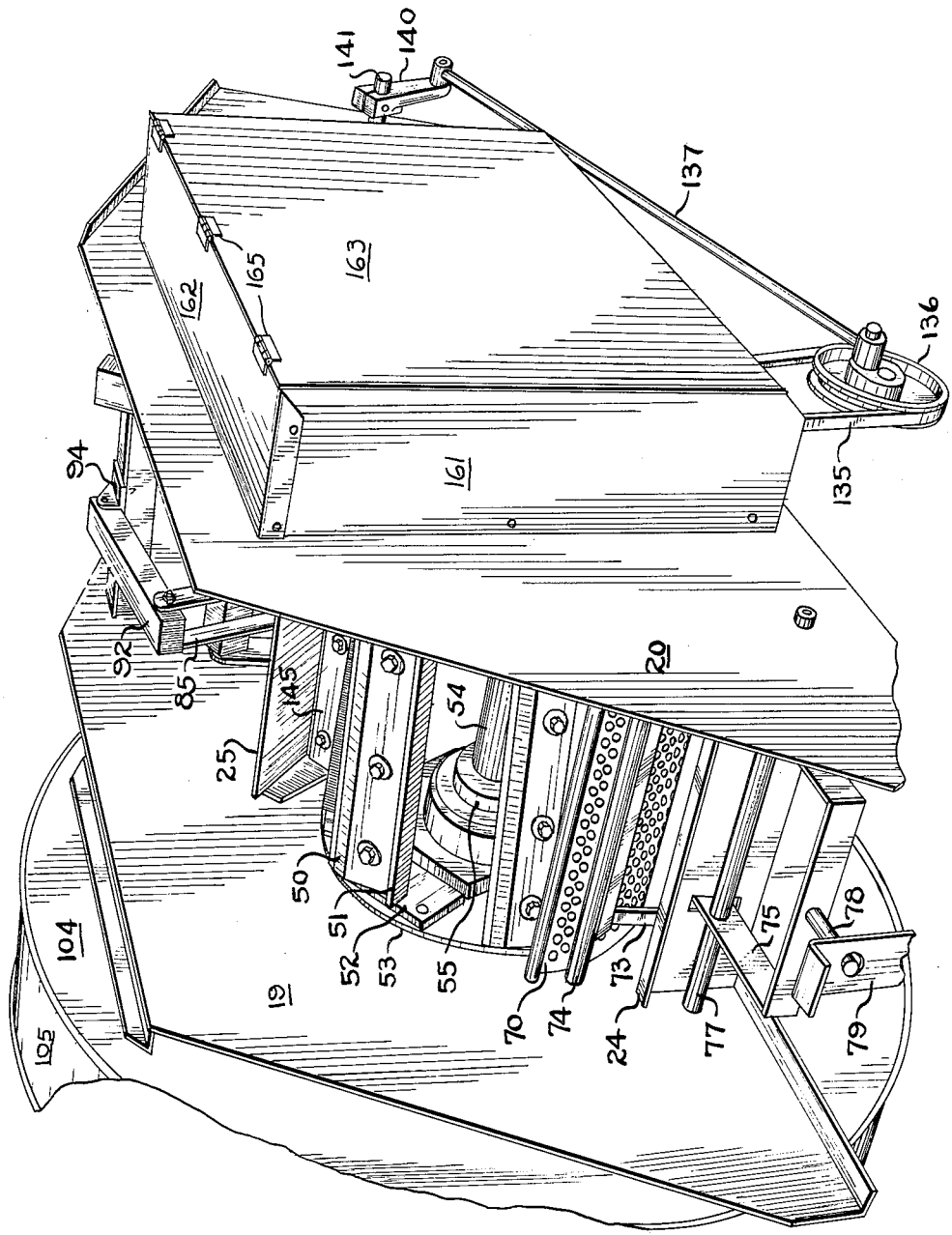

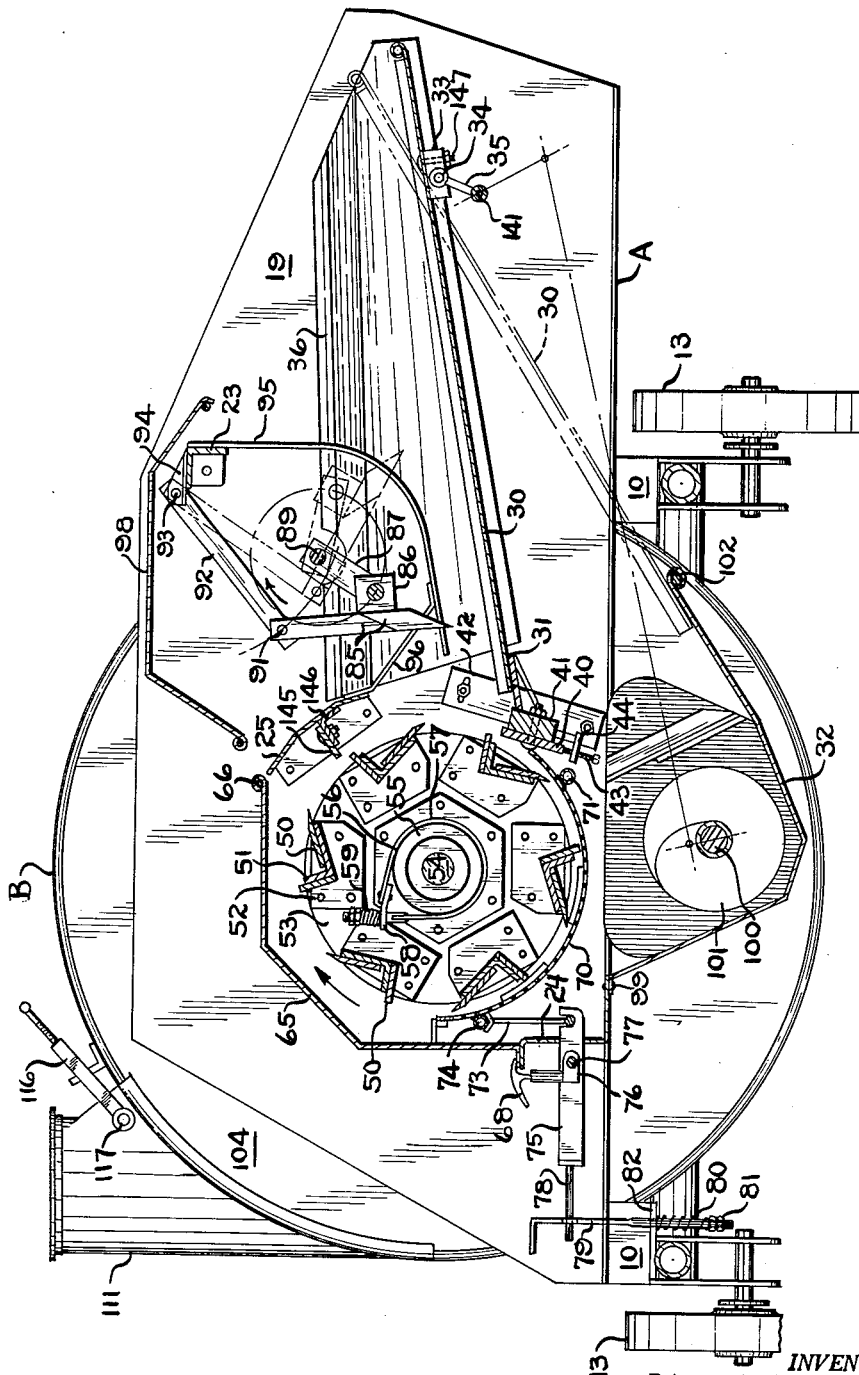

June 26, 1962 A. JACOBSEN ETAL 3,040,794
FORAGE CUTTER AND BLOWER
Filed June 29, 1960 5 Sheets-Sheet 5
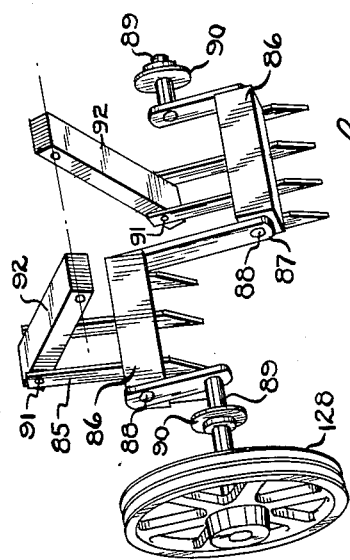
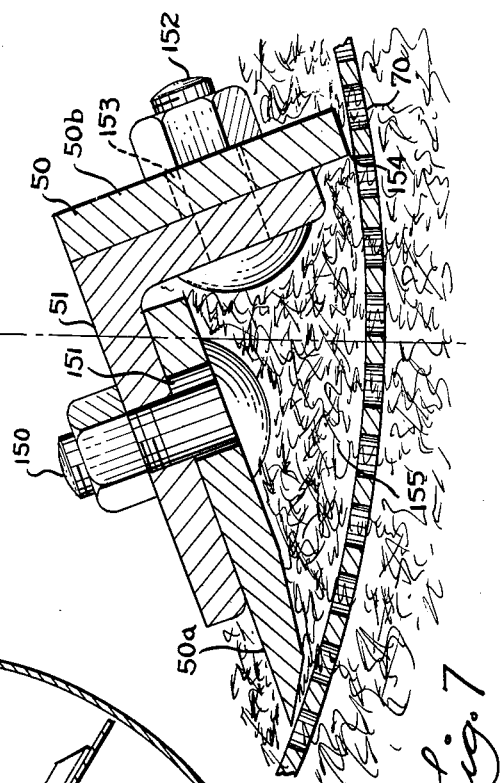
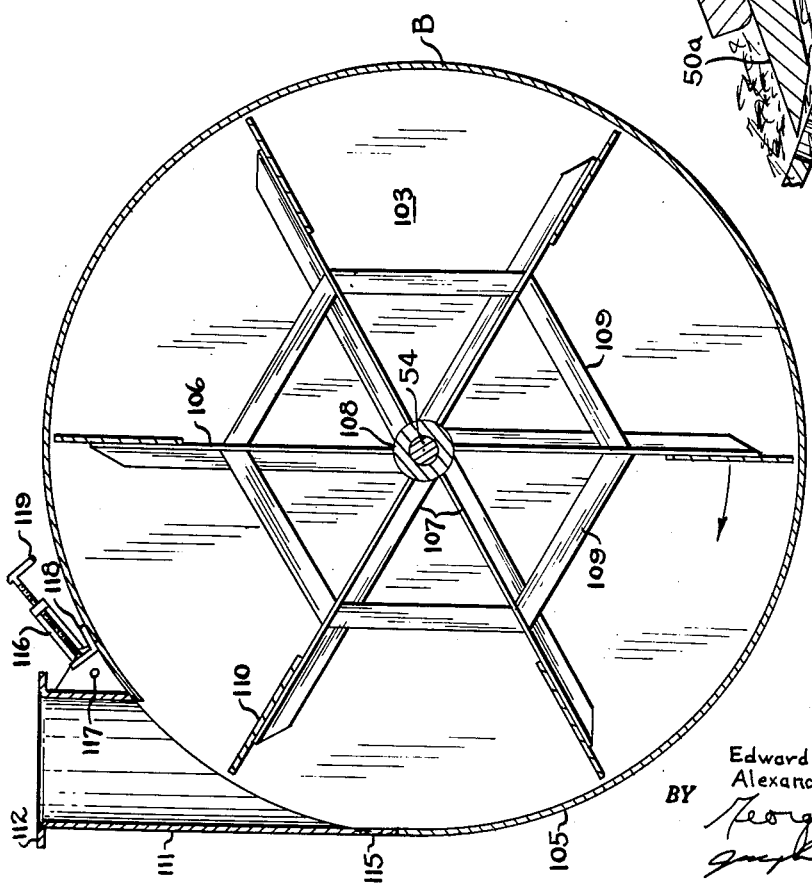
INVENTORS
Edward V. Kools
Alexander Jacobsen
BY
ATTORNEYS United States Patent Office 3,040,794
Patented June 26, 1962

3,040,794
FORAGE CUTTER AND BLOWER
Alexander Jacobsen and Edward V. Kools, Appleton, Wis., assignors to Kools Brothers, Inc., Menasha, Wis., a corporation of Wisconsin
Filed June 29, 1960, Ser. No. 39,702
7 Claims. (Cl. 146—107)

This invention relates to a single apparatus for cutting and blowing livestock forage or for alternative use as a simple blower without cutting, and to improved cutting means for cutting of livestock forage.

Previously it has been necessary to have two different machines to accomplish these purposes, one adapted only to the combined operation of cutting and blowing, and the other adapted only to blowing of forage not cut by the apparatus used for blowing. Machines of this sort are used for the cutting and/or blowing of such forage crops as corn stalks, ear corn, grass and other hay crops, and the like. The machine is ordinarily used for treatment of the forage in the field and blowing thereof into a trailer or other conveyor, or the threatment of the material and the immediate blowing thereof into a silo or similar storage means.

The principal object of this invention is to provide a single apparatus conveniently adjustable to perform a combined cutting and blowing operation or alternatively to perform a simple blowing operation without passing the forage through the cutting means.

A further object of the invention is to provide improved cutting means for a forage cutter and blower, comprising double cutting elements which permit greater cutting action without substantial increase in the power requirement.

These and further objects and advantages of the invention will be clear from the following description in connection with the attached drawings in which:

FIGURE 3 is a perspective view, partly cut away, of the rear end of the apparatus taken from the same side as FIGURE 1;

FIGURE 4 is a cross sectional view of the apparatus, taken along the line 4—4 of FIGURE 1;

FIGURE 5 is a cross sectional view taken along the line 5—5 of FIGURE 2;

FIGURE 6 is a detailed perspective view of a crankshaft and associated parts forming a part of the apparatus; and FIGURE 7 is an enlarged cross sectional view of one of the shear knives also shown in cross section in FIGURE 4.

Figure 1:
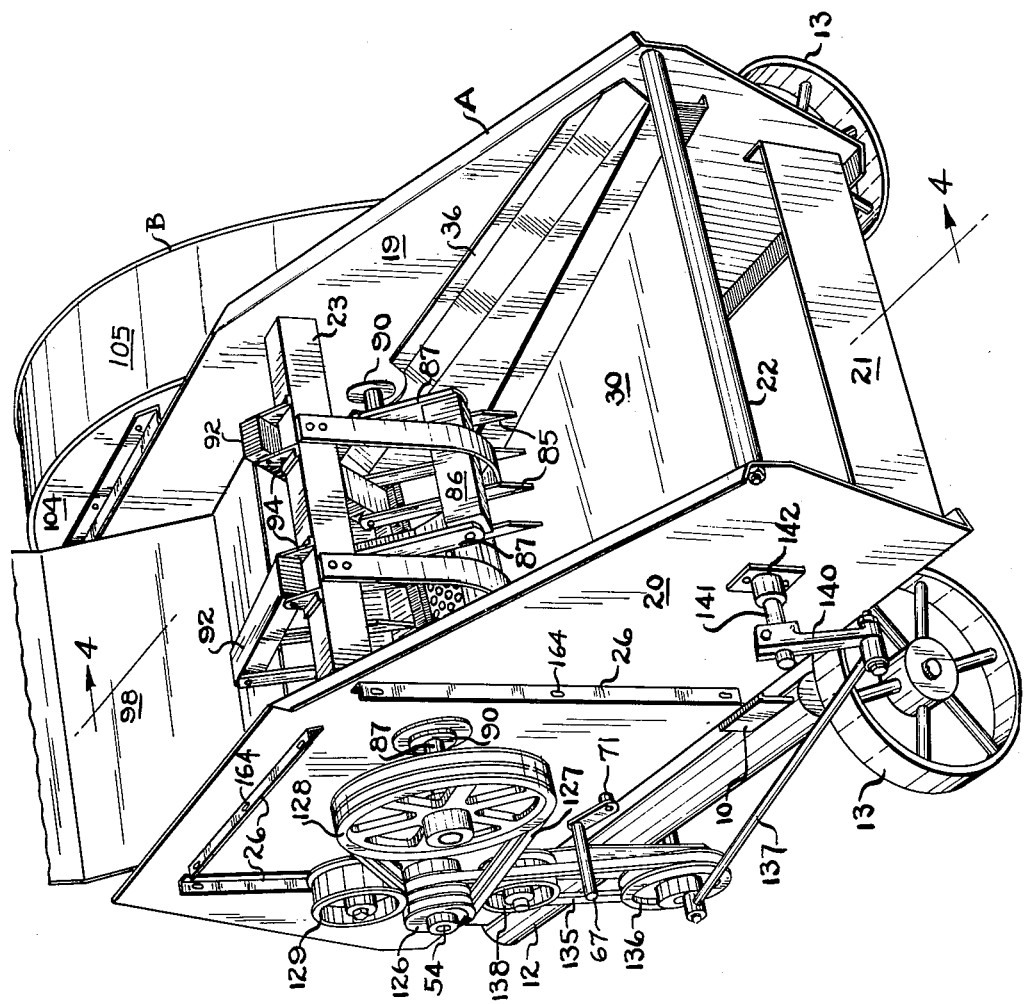
FIGURE 1 is a perspective view, partly cut away, taken from infeed end of the apparatus.
Figure 2:
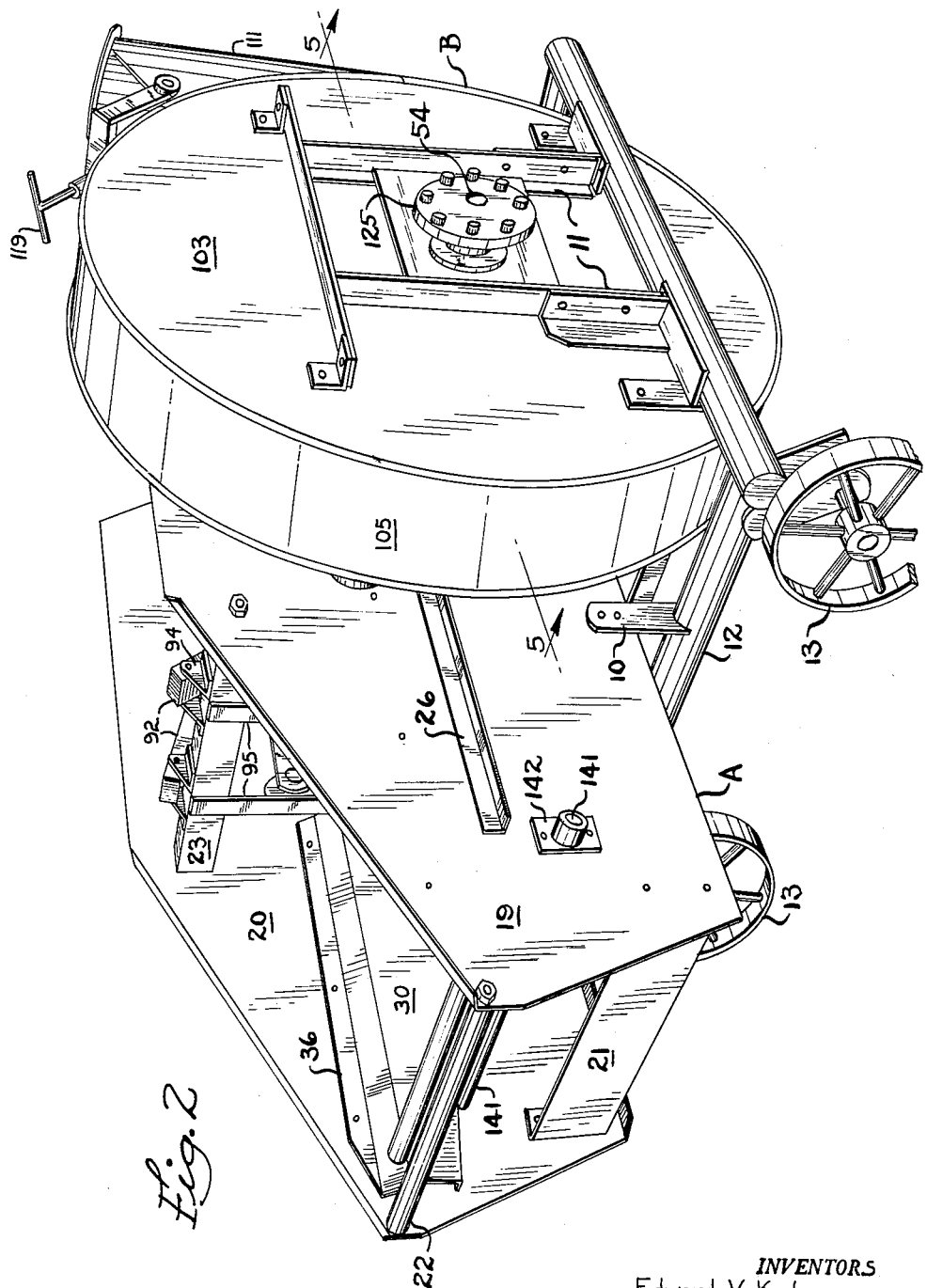
FIGURE 2 is a perspective view, partly cut away, primarly showing the infeed and blower sections of the apparatus, but taken from the side of the apparatus opposite from that of FIGURE 1.

Referring first to FIGURES 1, 2 and 3, the apparatus of this invention basically includes a cutting and screening unit A and a blower unit B, mounted by suitable framing bars 10 and 11 on main frame 12, which in turn is suitably mounted upon wheels 13 or other equivalent means for transporting of the apparatus.

The cutting and screening unit A includes main side plates 19 and 20, maintained in their spaced relationship by bracing elements 21-25, and stiffened by angle bars 26.

Referring also to FIGURE 4, a first conveyor, preferably comprising a shaker pan 30, is mounted in the infeed part of the cutting and screening unit, upon which the forage to be treated is deposited for conveying into the machine. FIGURE 4 in solid lines shows the pan in a first position, and in phantom lines shows the pan in the alternative of its two positions, as will be explained in detail later. In the first of these two positions, the inner end of the pan slidably rests upon a support 31 which is fastened to side plates 19 and 20, while in the alternative position the inner end slidably rests upon a support which may comprise the adjacent part of the auger pan 32, details of which will be explained later herein. The outer or remote end of the shaker pan 30 is attached to journals 33 by bolts 147, and the journals in turn are rotatably mounted upon rod 34 carried by the outer end of inner rocker arms 35 fixed to rocker shaft 141. Angled side guides 36 are fixed to side plates 19 and 20 in close association of the sides of shaker pan 30, to prevent dropping of uncut forage beyond the sides of the shaker pan before entering the chopping or cutting zone.

Conveyor or shaked pan 30 in its first position conveys the forage into the cutting unit, which includes a shear bar 40 mounted on a main support 41 in turn carried by end mounting brackets 42 secured to side plates 19 and 20. The position of cutter bar 40 may be adjusted, to determine fineness of cut of the forage and to account for wear, by set screw 43 mounted on a bar 44 fixed to support 41 or brackets 42.

The cutter head or cutting cylinder comprises a series of cutter knives generally indicated at 50, adjustably mounted on angle brackets 51, which in turn are fixed to cutter head brackets 52 on circular end plates 53. While cutter knives 50 are in FIGURE 3 shown as being mounted at an inclination with respect to plates 53, which also would result in their being mounted at an inclination with respect to shear bar 40, for improved shearing action, satisfactory cutting action may be achieved in many instances without having this inclined positioning. End plates 53 are rotatably mounted on main shaft 54, adjacent the ends of which are fixed hubs 55 having formed thereon clutch drums 56. Surrounding drums 56 are clutch bands 57, which at one end are fixed to brackets 58, in turn fixed to end plates 53. At the other end, bands 57 have an adjustable connection 59 by which their tension around drums 56 may be increased or decreased to vary the tightness of the slip clutch connection of the cutter head to shaft 54.

The upper portion of the cutter head zone is covered by a combined safety shield and housing 65, which at one end is pivotally mounted as at 66 to side plates 19 and 20, and at the other end is releasably held in place against brace 24 by catches 68. The lower ends of catches 68 are pivotally mounted on cross rod 77, which has its ends fixed to side plates 19 and 20.

The lower portion of the cutter head zone is closed by a screen 70 which may readily be interchanged with other screens of varying mesh to provide the desired fineness of cutting of the forage. Screen 70 it at one end mounted on removable rod 71 journaled in side plates 19 and 20, and at the rear end is supported by link 73 pivotally connected to the screen at 74. The other end of link 73 is pivotally held by lever arm 75, which in turn at an intermediate point 76 is pivotally mounted to cross rod 77. The other end 78 of lever arm 75 is urged downwardly by an adjustable link 79, having compression spring 80 mounted between lock nuts 81 and bracket 82 on the main frame. Spring 80 thus adjustably urges upwardly the end of screen 70 bearing pivotal connection 74. The degree of severity of this urging force determines the clearance between shear knives 50 and screen 70, which in combination with the size of screen 70 determines the fineness of cutting of the forage. Withdrawal of rod 71 facilitated by crank 67 (FIGURE 1), permits convenient replacement of screen 70, or for its removal in cases where a screen is not to be used for cutting of a particular forage material.

The forage deposited onto shaker pan 30 by hand or otherwise is carried by the shaker pan 30 into the cutter head zone, continuity of feed being assured by a plurality of spaced impelling teeth 85 which at an intermediate point are mounted on journals 86 which in turn are rotatably mounted on crankshaft 87. Referring also to FIGURE 6, journals 86 are rotatably mounted on bearing portions 88 of the crankshaft, the main bearing portions 89 being mounted in journals 90 fixed in side plates 19 and 20. One end of crankshaft 87 carries a pulley 128 which is driven in a manner explained later herein.

The upper ends of a pair each of teeth 85 are pivotally connected at 91 to one end of links 92, the other ends of which are pivotally connected at 93 to brackets 94 on cross frame braces 23. Rotation of crankshaft 87 in the direction shown by the arrow in FIGURE 4 provides motion of teeth 85 to continually feed into the cutter head zone forage which is deposited on shaker pan 30, a second position of the teeth being shown in phantom lines in FIGURE 4. Strippers 95 are mounted between certain of the teeth 85, at their upper ends being fixed to member 23, and at their lower ends being fixed to one end of connectors 96, the other ends of which are fixed to cross frame member 25. Strippers 95 insure that forage being impelled into the cutter head zone will not stick to and interfere with the action of the teeth. Shield 98 provides protection against inadvertent injury from the action of the teeth.

The forage cut by knives 50 is forced through screen 70 into a hopper defined by auger pan 32 mounted on unit A at 99 and 102. Rotatably mounted on shaft 100 within this hopper is a second conveyor preferably comprising an auger 101, which carries the chopped forage into the blower unit B.

Blower unit B (FIGURE 5) comprises a blower housing or band 105 mounted around spaced blower side plates 103 and 104, within which is a fan 106 mounted for rotation on main shaft 54. Fan 106 comprises arms 107 mounted on hub 108 fixed to shaft 54 and strengthened by connecting bars 109. The outer ends of arms of 107 carry blades 110, which impell the cut forage, which is fed into the bottom of the blower by auger 101, outwardly through outlet boot 111. The upper end of boot 111 has a flanged end as at 112, to which may be connected lengths of blower pipe for carrying of the impelled and cut forage to the top of a silo or elsewhere for disposal.

One end of the blower band 105 is fixed to an adjacent portion of boot 111 as at 115, while the other end is adjustably connected to an adjacent portion of boot 111 by a band tightener element 116. One end of element 116 is pivotally connected to boot 111 at 117, and is mounted through an opening in bracket 118 on band 105, and by means of hand screw 119 the tightness of band 105 about plates 103 and 104 may be adjusted, thus to permit changing the position of boot 111 for variation in angle of delivery of the forage. (See also FIGURE 4.)

The end of main shaft 54 extending beyond blower unit B (FIGURE 2) has a suitable mounting means 125 by which the shaft may be connected to the power take off unit of a tractor for supply of the power to operate the apparatus. Alternatively, shaft 54 could conveniently be connected to an electric motor or other suitable source of power. As previously indicated, the cutter head is connected to main shaft 54 by the slip clutch including band 57, so that a sudden jamming of the cutter head will not result in serious damage to the machine. If desired, fan 106 may be similiraly mounted on shaft 54. Shaft 54 extends on through the machine, and at its opposite end has keyed thereto a main drive pulley 126 (FIGURE 1). Pulley 126 is connected by belts 127 to driven pulley 128 keyed to crankshaft 87, the tension of belts 127 being maintained by adjustable idler pulley 129. Belt 135 is also driven by main drive pulley 126 to a pitman pulley 136, to which is eccentrically and pivotally attached a pitman 137. The tension in belt 135 is adjusted by idler pulley 138.

The other end of pitman 137 is pivotally connected to one end of outer shaker pan rocker arm 140, the other end of which is keyed to shaft 141, mounted in journals 142 on main side plates 19 and 20.

It will be clear from the foregoing description that rotation of the main shaft 54 in a clockwise direction as seen in FIGURES 1 and 4 will result in similar rotation of crankshaft 87 and pitman pulley 136, this later rotation resulting in essentially reciprocating motion of shaker pan 30, which, being mounted at an inclination leading downwardly into the cutter head zone and combined with the resulting impelling action by impellers 85 will result in positive feeding of the forage into the cutting area.

This invention also contemplates the improvement in a forage cutter of a secondary shear bar, in FIGURE 4 indicated at 145, which is bolted to an angle support 146 fixed to cross frame brace 25. Secondary shear bar 145 provides a point for secondary shearing action upon the forage by cutter knife 50, particularly acting upon forage which may have been carried by the cutter head past the primary shear zone at shear bar 40. This secondary shear bar and the consequent cutting action provided, is especially useful in cutting of hay, although its utility generally has also been established. This secondary bar is preferably positioned in a peripheral position relative to the shear bar 40 quite substantially removed therefrom.

Referring particularly to FIGURE 4, repositioning of shaker pan 30 from the full line position shown in FIGURE 4 to the position shown in phantom lines is achieved by removing bolts 147 by which the shaker pan is attached to journals 33, to detach the pan from the journals, withdrawing the pan slightly to permit its inner end to be dropped into the position shown in phantom lines, and then reattaching the shaker pan to the journals. While the invention as illustrated impresses the shaker pan previously described as a conveyor means, it will be obvious that alternative conveyor means might be substituted, for example the conventional elevator with a chain conveyor.

Referring also to FIGURE 7, this invention also comprises a new and particularly advantageous type of cutter knife, generally indicated at 50. The cutter knife is carried by a main supporting bar 51 fixed to brackets 52, as previously described. The knife itself consists of two elements, a forwardly directed, sharp edged knife blade 50a positioned at slightly in excess of a right angle with respect to a radius line C of the cutter head extended therethrough, and a rearwardly positioned auxiliary cutter blade 50b positioned at substantially a right angle with respect to blade portion 50a. Blade 50a is mounted to angle bracket 51 by bolts 150 which pass through openings 151 in blade 50a larger than the shank of bolt 150, so that the exact position of blades 50a may be adjusted to further provide for proper clearance with respect to screen 70 and to account for change in dimension in blade 50a resulting from sharpening, wear and the like.

Blade element 50b is similarly mounted on angle bracket 51 by bolts 152 passing through enlarged openings 153. It will be observed that blade element 50b is essentially rectangular in cross section and preferably is made of a hardened steel, thus providing four cutting edges which may alternatively be presented in the cutting position of edge 154 in FIGURE 7, thus permitting maximum use of blade 50b before it need be sharpened.

The blade construction just described thus provides not only the conventional cutting action represented by blade 50a shearing the forage between that blade and cutter bar 40, but also provides a substantial auxiliary cutting action of blade element 50b against shear bar 40. Further, as will be clear from FIGURE 7, the pocketing action between blade elements 50a and 50b creates a positive pressure for forcing the forage 155 through screen 70.

As seen in FIGURE 3, the pulleys and belts on the side of the apparatus preferably are covered by a safety shield comprising side plates 161, top plate 162, and door 163 hinged to plate 162. Plates 161 and 162 may be detachably secured to angle bars 26 (FIGURE 1), such as by bolts passing through holes 164 in those bars. By means of hinges 165 by which door 163 is fastened to top plate 162, the door may be conveniently opened for access to the pulleys and belts. For ease of understanding, this safety shield has been removed in FIGURE 1, as has also been done with respect to safety shield 98 in FIGURES 2 and 3.

We claim:

1. In apparatus for handling forage and the like, the combination of first conveyor means, a rotatable cutter head drum, a plurality of shear knives mounted on said drum, a primary shear bar mounted for shearing the forage between said bar and the shear knives, a secondary shear bar mounted rotatively ahead of the primary shear bar relative to the rotation of the drum, a curved screen of predetermined screen size mounted adjacent the lower part of said drum for forcing of the cut forage therethrough by said knives, a blower unit for blowing the forage from the apparatus to the place where it is to be deposited, second conveyor means mounted below said screen for carrying forage forced therethrough into said blower unit, said first conveyor means comprising a shaker pan adapted alternatively to carry forage fed thereto against said drum for cutting thereof by said knives or directly into said second conveyor means for carrying thereof into said blower unit, a first support for supporting an inner end of said pan adjacent the drum for feeding of the forage thereagainst, and a second support below the first support for alternatively supporting the inner end of the shaker pan for feeding of the forage directly into said second conveyor, said knives comprising a sharp edged first cutting portion mounted at slightly greater than a right angle with respect to a radius line of the drum passing therethrough and with the sharp edge directed in the direction of rotation of the drum and a reversible second cutting portion of substantially rectangular cross section mounted at substantially right angles thereto.

2. In apparatus for handling forage and the like, the combination of first conveyor means, a rotatable cutter head drum, a plurality of shear knives mounted on said drum, a shear bar mounted for shearing the forage between said bar and the shear knives, a curved screen of predetermined screen size mounted adjacent the lower part of said drum for forcing of the cut forage therethrough by said knives, a blower unit for blowing the forage from the apparatus to the place where it is to be deposited, and second conveyor means mounted below said screen for carrying forage forced therethrough into said blower unit, said first conveyor means being adapted alternatively to carry forage fed thereto against said drum for cutting thereof by said knives or directly into said second conveyor means for carrying thereof into said blower unit, said knives comprising a sharp edged first cutting portion mounted at slightly greater than a right angle with respect to a radius line of the drum passing therethrough and with the sharp edge directed in the direction of rotation of the drum and a reversible second cutting portion of substantially rectangular cross section mounted at substantially right angles thereto.

3. In apparatus for handling forage and the like, the combination of first conveyor means, a rotatable cutter head drum, a plurality of shear knives mounted on said drum, a shear bar mounted for shearing the forage between said bar and the shear knives, a curved screen of predetermined screen size mounted adjacent the lower part of said drum for forcing of the cut forage therethrough by said knives, a blower unit for blowing the forage from the apparatus to the place where it is to be deposited, and second conveyor means mounted below said screen for carrying forage forced therethrough into said blower unit, said knives comprising a sharp edged first cutting portion mounted at slightly greater than a right angle with respect to a radius line of the drum passing therethrough and with the sharp edge directed in the direction of rotation of the drum and a reversible second cutting portion of substantially rectangular cross section mounted at substantially right angles thereto.

4. In apparatus for handling forage and the like, the combination according to claim 3 in which said first cutting portion of the knives is mounted rotatably ahead of the second cutting portion relative to the rotation of the drum and said second cutting portion comprises a hardened steel bar of rectangular cross section detachably mounted on said drum to permit alternative mounting of said bar for alternate presentation of the four edges of said rectangular cross section bar as the shearing edge which acts against said shear bar for shearing of the forage.

5. In apparatus for handling forage and the like, the combination of conveyor means, a rotatable cutter head drum, a plurality of shear knives mounted on said drum, a shear bar mounted for shearing the forage between said bar and the shear knives, and a blower unit for blowing the sheared forage from the apparatus to the place where it is to be deposited, said conveyor means being mounted and driven to directly and positively carry forage against said drum or alternatively to said blower unit in by-pass of the drum, said conveyor means including a shaker pan, a first support for supporting an inner end of said pan adjacent the cutter drum for feeding of the forage thereagainst, and a second support below the first support for alternatively supporting the inner end of the shaker pan for feeding of the forage to the blower unit in by-pass of the drum, said shaker pan adjacent its outer end being pivotally supported to permit such alternative supporting of the inner end on said first support and said second support.

6. In apparatus for handling forage and the like, a rotatable cutter head drum, including a plurality of shear knives mounted on said drum, a shear bar mounted for shearing the forage between said bar and the shear knives, said knives comprising a sharp edged first cutting portion mounted at slightly greater than a right angle with respect to a radius line of the drum passing therethrough and with the sharp edge directed in the direction of rotation of the drum and a reversible second cutting portion of substantially rectangular cross section mounted at substantially right angles thereto.

7. In apparatus for handling forage and the like, the combination of driven first conveyor means, a rotatable cutter head drum, a plurality of shear knives mounted on said drum, a shear bar mounted for shearing the forage between said bar and the shear knives, a curved screen of predetermined screen size mounted adjacent the lower part of said drum for forcing of the cut forage therethrough by said knives, a blower unit for blowing the forage from the apparatus to the place where it is to be deposited, second conveyor means mounted below said screen for carrying into said blower unit forage fed to the second conveyor means, a first support for supporting an inner end of the first conveyor means adjacent the drum for direct and positive feeding of forage thereagainst, and a second support below the first support for alternatively supporting the inner end of the first conveyor means for feeding of forage directly and positively into said second conveyor means, said first conveyor means adjacent its outer end being pivotally supported to permit selective and alternative positioning of the inner end of the first conveyor means on said first support or on said second support respectively to carry forage fed thereto directly and positively against said drum for cutting thereof by said knives or directly and positively into second conveyor means for carrying thereof into said blower unit.

References Cited in the file of this patent
UNITED STATES PATENTS

| | | |
|---|---|---|
| 132,868 | Smith | Nov. 5, 1872 |
| 1,172,114 | Debaker | Feb. 15, 1916 |
| 1,443,276 | Roberts | Jan. 23, 1923 |
| 1,530,095 | Sharp | Mar. 17, 1925 |
| 1,558,613 | Holland-Letz et al. | Oct. 27, 1925 |
| 2,959,175 | Oberholtz et al. | Nov. 8, 1960 |